(12) United States Patent
Collins

(10) Patent No.: US 6,237,051 B1
(45) Date of Patent: May 22, 2001

(54) ASSET TRACKING WITHIN AND ACROSS ENTERPRISE BOUNDARIES

(75) Inventor: David Jarrett Collins, Duxbury, MA (US)

(73) Assignee: Data Capture Institute, Duxbury, MA (US)

( * ) Notice: Subject to any disclaimer, the term of this patent is extended or adjusted under 35 U.S.C. 154(b) by 0 days.

(21) Appl. No.: 09/120,807

(22) Filed: Jul. 23, 1998

Related U.S. Application Data

(60) Provisional application No. 60/053,680, filed on Jul. 24, 1997.

(51) Int. Cl.$^7$ ............................ H04L 12/28; G06F 17/60; G06F 17/30; G06F 3/00; H04M 3/42
(52) U.S. Cl. ................................ 710/36; 379/201; 710/1; 710/240; 702/84; 345/339; 705/22; 705/8
(58) Field of Search ............................. 705/8, 22; 710/1, 710/36, 240, 241; 700/266; 340/825.54, 572, 825.35, 432; 361/683; 235/454; 455/39; 707/203; 709/218; 702/84; 379/201; 345/339

(56) References Cited

U.S. PATENT DOCUMENTS

| | | | |
|---|---|---|---|
| 4,558,413 | * 12/1985 | Schmidt et al. | 707/203 |
| 5,311,423 | * 5/1994 | Clark | 705/8 |
| 5,383,112 | * 1/1995 | Clark | 705/8 |
| 5,548,637 | * 8/1996 | Heller et al. | 379/201 |
| 5,630,072 | * 5/1997 | Dobbins | 705/22 |
| 5,640,151 | * 6/1997 | Reis et al. | 340/825.54 |
| 5,661,457 | * 8/1997 | Ghaffari et al. | 340/572 |
| 5,697,061 | * 12/1997 | Krueger et al. | 455/39 |

(List continued on next page.)

FOREIGN PATENT DOCUMENTS

0748080A1 * 12/1996 (EP) ............................ H04L/12/28

OTHER PUBLICATIONS

"Automatic Data Collection", New Equipment Digest, May 2000, vol. 65 Issue 5, p66, ½p.*

(List continued on next page.)

*Primary Examiner*—Thomas Lee
*Assistant Examiner*—Katharina Schuster
(74) *Attorney, Agent, or Firm*—Venable; Laurence J. Marhoefer

(57) ABSTRACT

A unique data label is affixed to each tracked asset and a unique data label for each location in the enterprise, both real and virtual locations. Location history data of the asset is related to other asset data in a relational data base. Assets typically include system components down to the least repairable/replaceable unit (LRU). The data label, in the preferred embodiment of the invention, is a code label using a code that ensures each label is unique to the asset or location to which it is attached. Here the word location is an inclusive term. It includes the geographical location and the identity of the building in which the asset is housed. Location also includes the identity of the system of which a component is a part and, if relevant, location within the system. It includes also any real or virtual location of interest for subsequent analysis and is ultimately defined by the nature of the system being tracked.

People assigned to install, upgrade, maintain, and do other work on the system are identified and this identifying data is entered into the data base along with each activity performed on the system and its components. Preferably, in response to a scanned asset label, a menu of allowable activities is presented so that the person assigned to do a task associated with the asset can easily make entries into the data base of the code assigned to the task performed. With asset data, asset location, and task record (including the person performing the task), entered into the relational data base, it is relatively easy to track the components of complex systems in a large enterprise over time and build complex relational records.

3 Claims, 2 Drawing Sheets

U.S. PATENT DOCUMENTS

| | | | | |
|---|---|---|---|---|
| 5,708,423 | * | 1/1998 | Ghaffari et al. | 340/825.35 |
| 5,812,130 | * | 9/1998 | Huben et al. | 345/339 |
| 5,831,819 | * | 11/1998 | Chacon et al. | 361/683 |
| 5,841,365 | * | 11/1998 | Rimkus | 340/825.35 |
| 5,884,035 | * | 3/1999 | Butman et al. | 709/218 |
| 5,917,407 | * | 6/1999 | Squire et al. | 340/432 |
| 5,918,191 | * | 6/1999 | Patel | 702/84 |
| 5,979,761 | * | 11/1999 | Wurz et al. | 235/454 |
| 6,097,995 | * | 8/2000 | Tipton et al. | 700/266 |

OTHER PUBLICATIONS

Jones, S. "Motorola Introduces Smart Paper", Crain's Chicago Business, Feb. 2000, vol. 23, Issue 9, p16, ⅕p.*

Faloon, K. "Inventory Partners", Supply House Times, Feb. 2000, vol. 42 Issue 12, p32, 4p, 3c.*

"Figurine Manufacturer Keeps Tabs on the Goods", Automatic I.D. News, May 98, vol. 14 Issue 6, p24, 2p, 1 chart, 2c.*

Harter, K. "A Quick Read", American Nurseryman, May 98, vol. 187 Issue 9, p28, 6p, 1c.*

Jesitus, J. "Warehouse Management System Bears Fruit", Automatic I.D. News, Jan. 98, vol. 14 Issue 1, p14, 4p, 2c.*

"Asset Tracking Benefits Large Organizations", Automatic I.D. News, Oct. 97, vol. 13 Issue 11, p32, 2p, 1 chart, 1 diagram.*

"On the Road to a Paperless System", Automatic I.D. News, Jul. 97, vol. 13 Issue 8, p22, 1p, 2c.*

Bates, A. "Taming the Inventory Dragon", American Nurseryman, Jul. 1997, vol. 186 Issue 1, p52, 9p 4c.*

"Bar Code Control Systems Improve Inventory Operations", Automatic I.D. News, Oct. 1996, vol. 10 Issue 11, p34, 2p, 1 chart, 4c.*

"McDonnell Douglas: Flying High with RF/DC", Automatic I.D. News, Aug. 1995, vol. 11 Issue 9, p18, 2p, 1 chart, 4c.*

"Software Products", Automatic I.D. News, Jun. 1995, vol. 11 Issue 6, p54, 3p, 3bw.*

"Going Mobile on the Manufacturing Floor", Automatic I.D. News, Apr. 1995, vol. 11 Issue 4, p22, 2p, 1bw.*

"Making the Transition to World–Class Performance", Automatic I.D. News, Mar. 1995, vol. 11 Issue 3, p58, 3p, 1 chart, 2c.*

* cited by examiner

ASSET TRACKING WITHIN AND ACROSS ENTERPRISE BOUNDARIES

This application claim benefit to provisional application No. 60/053,680 Jul. 24, 1997.

BACKGROUND OF THE INVENTION

1. Field of the Invention

This invention relates to an improved system for gathering and entering data for use in tracking and managing assets in a complex, diverse enterprise, and more particularly, to a system that gathers and links data down to the least repairable/replaceable units in a system and within and across enterprise boundaries.

Large enterprises such as multi-national corporations, government agencies, and even smaller organizations having an affinity to other organizations with similar operating assets, have a barrier to easily tracking the performance of complex operating assets over time. These assets are typically composed of components produced by independent suppliers to comprise subsystems which in turn are combined to perform as a large system. The performance of the large system is dependent upon the reliability of each subsystem which, in turn, is dependent upon the reliability of components. Examples of complex systems would include telecommunications and air traffic control systems. To manage assets in such a complex environment, data is needed to identify not only where the components are, but also where they came from, how they got there, and what has been done through their service life and is being done to them.

2. Description of the Prior Art

As will be appreciated by those skilled in the art, code labels (e.g. bar code labels, radio frequency (rf) labels and static discharge chip labels) have been used in the prior art in connection with asset tracking. These prior art systems, while generally satisfactory, do not conceptually address the entire problem with the vision necessary to systematically and reliably capture the data required to track and manage assets, particularly relational data that enables problem analysis, revision, and repair of assets in a diverse, complex enterprise.

SUMMARY OF THE INVENTION

An object of this invention is the provision of a system that facilitates the gathering and use of asset data to track, and manage the assets, including problem analysis, revision, and repair of the assets.

Another object is a system that simplifies the process of tracking the components of complex systems in a large enterprise and among separate enterprises over long time periods in order to isolate and correct component reliability issues.

Briefly, this invention contemplates affixing a unique data label to each tracked asset and a unique data label for each location in the enterprise, both real and virtual locations. Location history data of the asset is related to other asset data in a relational data base. Assets typically include system components down to the least repairable/replaceable unit (LRU). The data label, in the preferred embodiment of the invention, is a code label using a code that ensures each label is unique to the asset or location to which it is attached. Here the word location is an inclusive term. It includes the geographical location and the identity of the building in which the asset is housed. Location also includes the identity of the system of which a component is a part and, if relevant, location within the system. It includes also any real or virtual location of interest for subsequent analysis and is ultimately defined by the nature of the system being tracked.

People assigned to install, upgrade, maintain, and do other work on the system are identified and this identifying data is entered into the data base along with each activity performed on the system and its components. Preferably, in response to a scanned asset label, a menu of allowable activities is presented so that the person assigned to do a task associated with the asset can easily make entries into the data base of the code assigned to the task performed. With asset data, asset location, and task record (including the person performing the task), entered into the relational data base, it is relatively easy to track the components of complex systems in a large enterprise over time and build complex relational records.

BRIEF DESCRIPTION OF THE DRAWINGS

The foregoing and other objects, aspects and advantages will be better understood from the following detailed description of a preferred embodiment of the invention, in which.

DETAILED DESCRIPTION OF A PREFERRED EMBODIMENT

Figure 1:
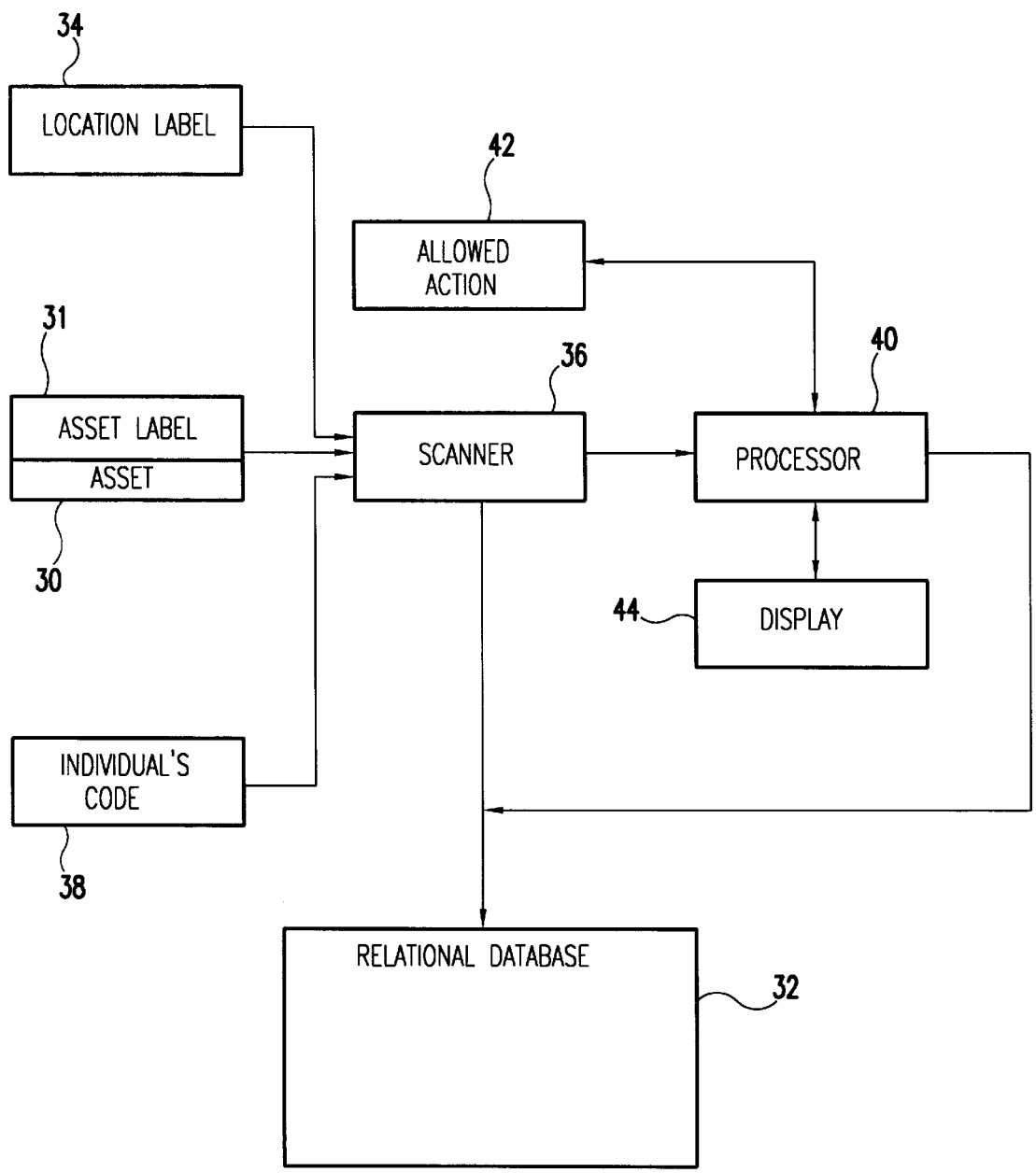
FIG. 1 is a functional block diagram of an embodiment of an asset management data system in accordance with the teachings of this invention.
Figure 2:
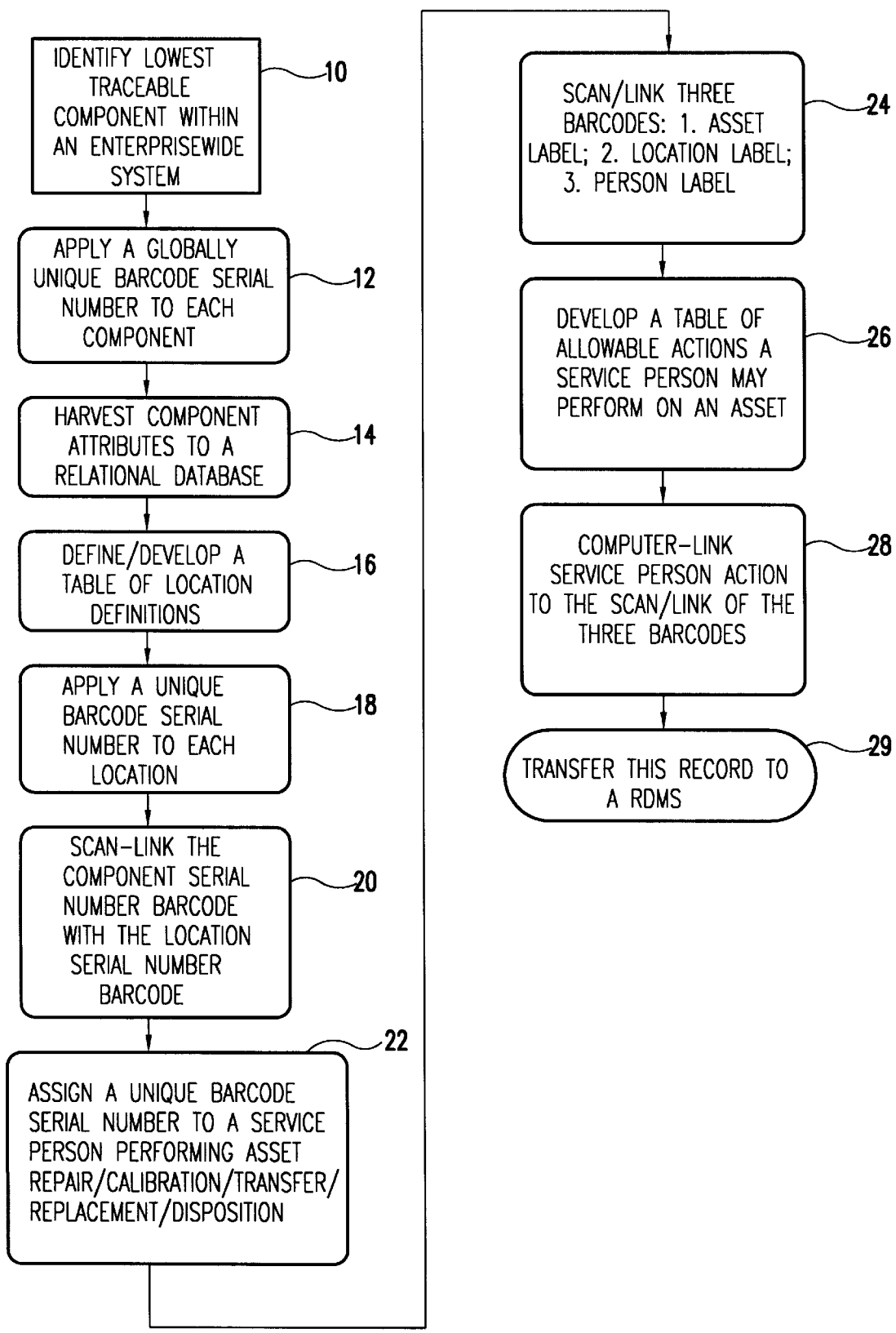
FIG. 2 is a flow chart illustrating the method steps for the asset management data system in accordance with the teachings of the invention.

Referring now to FIGS. 1 and 2, each asset 30 has an asset label 31, illustrated in FIG. 1. As represented at step 10 in FIG. 2, engineering judgment must be exercised in examining the design of each complex system to determine the component or module level at which to begin asset tracking. Individual printed circuit boards (PCBs), power supplies, display components, antenna structures and similar components would certainly qualify for detailed tracking. Components on PCBs, if removable such as memory chips or processor chips, may also qualify for tracking. Components (i.e. assets) identified in step 10 are labeled in step 12 with asset identification label 31 applied to them. This label is of the nature of a serial number that cannot be interpreted as any other message or identification code by an identification reader within the sphere of circulation of these assets; for example, the UCC/EAN-128 messaging system using Application Identifiers.

At the time the component label is applied in step 12, relevant component detail is inputted, linked to the component label data and transferred to a relational database 32, in step 14. Component detail might include subcomponent parts, revision level of the component, date and location of manufacture, inspection procedures at the time of manufacture, cross reference information for component identification, such as manufacturer part number and related serial number, and National Stock Number (NSN) if applicable.

The tracking system anticipates movement of components and subsystems within a large enterprise and enterprise to enterprise.

A table of possible component or subsystem locations is developed (step 16) to enable enterprise-wide tracking. If the component label were applied at the time of manufacture, as described in 12, that manufacturing location would be an element of the table. If the component is then received at the system user's warehouse or receiving station, that location also would be an element of the table. Where the component is placed in a subsystem is also a location in the table as would be where the subsystem was placed within the system, etc.

A location label 34 is affixed, where possible, to the production line, receiving location, subsystem rack or cabinet, various site spare cabinets, and equipment huts, etc. at step 18. Data within these labels also must be unambiguous throughout the enterprise so that an identification scanner will not confuse this data or message with any other message that scanner may read. The relational data base 32 relationally stores the location code, the location description, the asset code, and the asset description.

For purposes of performing component or subsystem inventory, recording system maintenance or calibration, etc., and change of asset location a reader or readers 36 read at each event the relevant component(s) asset label and the location asset labels at step 20, and the data stored in data base 32.

A service person performing component service may have a bar code or other identification label 38 affixed to his/her badge, step 22. The service person identity could be inputted via a personal computer with a code signature assigned to that person, or keyed in by the person. The system reads the service person's labeled badge, or the person otherwise signs on to a computer or data network 40 for the activity site, and the three code labels are read (i.e. asset label, location label, and personal labels) and linked in the relational data base, step 24.

A menu of allowable service person actions 42, developed for each component in the system and each location of interest to component tracking at step 26, is called up on a display 44 in response to inputs from processor 40. For instance at a receiving location, a service person may be allowed to receive, inspect and put away components to a stock location. At an operating subsystem site, a service person may be allowed to remove a component and install a spare component, etc.

In step 28, in order to update the relational database regarding each service event (the sum of which constitutes asset tracking), the service person enters (e.g. point and click) the description of the service performed, linked to his/her identity, component label data, and location label data, all of which have been inputted into the local computer or data network in the previous steps. The data accumulated in step 28 is transferred to the relational database 32 in step 29.

While the invention has been described in terms of a single preferred embodiment, those skilled in the art will recognize that the invention can be practiced with modification within the spirit and scope of the appended claims. For example, the various locations within an enterprise and locations in other enterprises can be linked to a relational data base over the internet.

Having thus described my invention, what I claim as new and desire to secure by Letters Patent is as follows:

1. A method for gathering physical asset data for systems in an enterprise in order to be able to track the asset over time and physical location, including steps of;

identifying traceable components for each asset in a system;

entering in a relational data base a globally unique component code for each traceable component;

applying a physical label with the globally unique component code respectively to each traceable component;

entering component attributes for said each traceable component in the relational database;

developing a table of location definitions;

applying a physical label with the unique location code respectively to locations as defined in said table of location definitions;

reading the component label code and the location label code when the location of the component changes and entering these codes in the relational data base;

assigning a unique code to a service person;

entering the code assigned to the service person and the component code into the relational data base each time a service person takes an action with respect to a component;

lining the three codes, namely, asset code, location code and service person code in the relational data base;

developing a table of allowable actions a service person may perform on an asset; and entering a service person action from said table in the relational data base linked to said asset code, said location code, and said code assigned to the service person.

2. A method for gathering physical asset data for an enterprise in order to be able to track the asset over time and physical location as in claim 1 wherein each label code is a scan code.

3. A method for gathering physical asset data for an enterprise in order to be able to track the asset over time and physical location as in claim 1 wherein each scan code is a bar code.

* * * * *